US008958546B2

(12) United States Patent
Probert

(10) Patent No.: US 8,958,546 B2
(45) Date of Patent: Feb. 17, 2015

(54) STEGANOGRAPHIC MESSAGING SYSTEM USING CODE INVARIANTS

(75) Inventor: Thomas H. Probert, Holden, MA (US)

(73) Assignee: Stegosytems, Inc., Holden, MA (US)

( * ) Notice: Subject to any disclaimer, the term of this patent is extended or adjusted under 35 U.S.C. 154(b) by 1104 days.

(21) Appl. No.: 12/965,067

(22) Filed: Dec. 10, 2010

(65) Prior Publication Data

US 2014/0108803 A1    Apr. 17, 2014

Related U.S. Application Data

(60) Provisional application No. 61/285,653, filed on Dec. 11, 2009.

(51) Int. Cl.
  *H04L 29/06* (2006.01)
  *H04L 9/32* (2006.01)
  *G06F 21/12* (2013.01)

(52) U.S. Cl.
  CPC ............ *H04L 9/3244* (2013.01); *G06F 21/125* (2013.01)
  USPC .......................................................... 380/28

(58) Field of Classification Search
  CPC .................................................. G06F 21/125
  USPC .......................................................... 380/28
  See application file for complete search history.

(56) References Cited

U.S. PATENT DOCUMENTS

| | | |
|---|---|---|
| 6,782,478 B1 | 8/2004 | Probert |
| 7,080,257 B1 | 7/2006 | Jakubowski |
| 7,236,610 B1 | 6/2007 | Luo et al. |
| 2005/0105761 A1* | 5/2005 | Zimmer et al. ............... 382/100 |
| 2006/0210138 A1* | 9/2006 | Hilton et al. .................. 382/137 |
| 2008/0016365 A1* | 1/2008 | Moskowitz .................... 713/176 |
| 2008/0301452 A1 | 12/2008 | Horne et al. |
| 2009/0105761 A1 | 4/2009 | ***Robie |
| 2009/0187963 A1 | 7/2009 | Bori |
| 2009/0254752 A1 | 10/2009 | Johansson |

OTHER PUBLICATIONS

Cox et al., Digital Watermarking, Academic Press, 2002, pp. 50-55, San Diego, CA, ISBN: 1-55860-714-5.
Collberg et al., Watermarking, Tamper-Proofing, and Obfuscation—Tools for Software Protection, University of Arizona, Dept. of Computer Science, Feb. 10, 2000.
International Search Report mailed Dec. 5, 2011 in corresponding International Application No. PCT/US10/59882.

* cited by examiner

*Primary Examiner* — Mohammad L Rahman
(74) *Attorney, Agent, or Firm* — Chapin IP Law, LLC

(57) ABSTRACT

A steganographic method to prevent the execution of malicious code and mitigate software piracy. The method uses invariant portions of machine instructions to create an executable watermark within unmodified code. This watermark can be verified at any stage of the software lifecycle, including dynamically and continuously during execution, to detect foreign code by verifying the integrity of the watermark prior to execution. In addition, the watermark may serve as a steganographic covert channel concealing additional information. Code invariants are not altered by binding operations such as loading and linking on different machines, and thus may be employed to consistently and repeatedly identify an unmodified instantiation of a particular program. The use of opcodes and register references as invariants avoids trivial register substitution as a means of program differentiation that eludes detection. The split key structure of the resulting cipher implies that knowledge of only the code (first key) or the cipher table (second key) alone is insufficient to derive the message.

8 Claims, 7 Drawing Sheets

STEGANOGRAPHIC MESSAGING SYSTEM USING CODE INVARIANTS

RELATED APPLICATIONS

This application claims priority to and the benefit under 35 U.S.C. §119(e) of U.S. Provisional Patent Application No. 61/285,653, filed Dec. 11, 2009, entitled "SECURE SPLIT KEY STEGANOGRAPHIC MESSAGING METHOD," the contents of which is hereby incorporated by reference in their entirety.

BACKGROUND

Steganography and digital watermarking are powerful techniques for protecting intellectual property by embedding signatures and other information in audio, video and other digital media. Recognizing these signatures and verifying their integrity identifies intellectual property to prevent its misuse, detect its modification or generate royalties.

The study of steganography encompasses the practice of hidden or obscured messages in printed and visible works, and includes outright cryptography and other ciphers which render the media unintelligible. Unlike cryptography, however, steganographic techniques in general do not obfuscate the underlying media item, and therefore do not draw attention the way encryption does. Therefore, while steganographic implementations may inject either readily visible or more obscured artifacts in the underlying media item, they generally do not prohibit intelligible reception by the user, but rather continue to merely denote the source or origin of the media item. Conventional watermarks include visible markings and/or images currency, commercial instruments (checks), government IDs (e.g. driver licenses) and video broadcasts. A common property is that modification to generate a purported similar version (duplicate or unchanged original) is very difficult to perform without also modifying the watermark in a detectable manner, thus providing a level of security to the unmodified original.

Modern information security issues surrounding computer software devote much attention to malicious code. Malicious code is an executable addition to an installed program that, unbeknownst to the user, infiltrates the code for performing extraneous operations such as gathering personal information, launching an email barrage, or simply corrupting or destroying other files. Malicious code typically takes the form of a virus, worm or Trojan horse, each with subtle differences in operation and objectives, but having the common operation of modifying an existing code segment to introduce foreign executable software for performing unwanted operation.

SUMMARY

Conventional approaches to information security rely on passwords and encryption. Password systems simply invoke a secret key or phrase before permitting access, while encryption schemes reorganize the information to render it unintelligible. Cryptographic techniques (encryption and complementary decryption) apply a mathematical function to data to generate an unintelligible (encrypted) form, and apply an inverse function to return the original (decryption). The cryptographic function may involve a single private key (similar to a password) for the forward (encryption) and inverse (decryption) function, or may involve two separate but related keys, as in public key encryption.

Conventional security measures suffer from the shortcoming that they are susceptible to attack from so-called exhaustive "brute force" attempts to derive the inverse function by application of substantial computational resources. Single key encryption and password schemes may be overcome by repetitive generation of every possible permutation of the key. Public key encryption schemes may be overcome by factoring large prime numbers that associate the public and private key pair. Generally, such schemes are coupled with a procedural requirement to change the key periodically to avoid such brute force attacks, presumably changing the key before an exhaustive approach is successful.

Configurations disclosed herein are based, in part, on the above observation that encryption keys may be compromised through the application of sufficient computing resources applied to the encrypted form, thus deriving the inverse (decryption) function. Configurations disclosed herein define a secure cipher which leaves the original in an unmodified form, thus providing no clues or function results from which to derive the inverse function. Ciphers differ from encryption in that ciphers define an alternate alphabet mapped via a cipher function between symbols in the respective alphabets, while encryption computes an alternate value based on an encryption function independent of an alternate alphabet.

Configurations herein substantially overcome the above-described security mechanisms because the subject code segment sought to be protected remains unchanged, thus providing no clues as to an embedded security function (secure watermark) in the data. Further, a ciphertext generated from the code segment maintains a many to many mapping between corresponding symbols in the code segment and the corresponding cipher text. Conventional ciphers define an alternate alphabet in which like symbols share the same mapping, such as "a"="1", "b"="2", etc. Configurations discussed below define a steganographic watermark encapsulated in a code segment through an alternate alphabet for defining a cipher message, and define a cipher table employed for mapping symbols from the code segment. Invariants in the code segment form the alternate alphabet. Symbols from the cipher message are mapped to the invariants in the code segment, and the association between the symbols (message symbol to code invariant) recorded in the cipher table. The use of code invariants allows validation from the executing code without introducing aspects of the loading and linking process which relocates the code segment and thus modifies certain code values between instantiations. Validation of the code segment as being unmodified involves retrieving the cipher message, the cipher table, and the code segment for validation, and mapping each symbol (letter) in the message to the corresponding invariant in the sequence of invariants from the code ($1^{st}$ symbol to $1^{st}$ invariant, $2^{nd}$ symbol to $2^{nd}$ invariant, etc) and ensuring that the message symbol is included in the set of message symbols associated with that invariant. In this manner, any alteration of the code segment that disrupts the ordering or values of the invariants causes the mapping to fail, thus flagging the alteration.

Ciphers define an alternate of symbols via a mapping of each symbol to its replacement (coded) symbol. Encryption applies a function to a message to render it unintelligible, in which an inverse function returns the original message. In conventional ciphers, the original message to be protected and the ciphertext share the same alphabet. Configurations herein disclose a cipher that defines an alternate alphabet of symbols in which to generate a message, and defines a mapping to a message in the alternate alphabet. Further, unlike conventional ciphers where each mapping of a symbol always maps to the same symbol in the ciphertext (i.e. "A" maps to "R", "E" maps to "W", for example), the mapping defines different symbols for each occurrence of the symbol, i.e. "a" may map to "r" in one occurrence and to "x" in another.

Conventional approaches do not identify foreign executable software, i.e., software not intended for execution on a specific platform such as self-modifying malicious code, malware and pirated software. This is more of a problem for executable applications than for digital media, which avoids any transformation via compiling, linking and loading. While encryption, code signatures, checksums and hash codes are common in the protection of executables, they are not in themselves executable. While these techniques secure transport, storage and validate origin and ownership as an important element of the chain of trust, they are removed prior to execution and can't protect the executable during actual execution.

Conventional techniques for encoded steganographic messages, such as that disclosed in U.S. Pat. No. 6,782,478, employ static values defined as register references in the machine instructions upon which the sequence of invariants is derived. Configurations disclosed herein are based, in part, on the observation that other instruction fields elude reassignment during binding operations such as linking and loading, and define a greater set of invariants from which to draw associations to a corresponding alphabet, or set of symbols.

Conventional steganographic systems suffer from the shortcoming that the authentication message carried as a watermark in the protected media is asymmetrical, in that a single compromised value, token or message in the media allows recreation of the watermark. Accordingly, configurations herein substantially overcome such shortcomings by defining a split key steganographic system employing the code segment as a first key and the cipher table as a second key, such that both the code segment and corresponding cipher table are required to compute the message.

Knowledge of only the code (first key, SK1) or the cipher table (second key, SK2) alone is insufficient to derive the message, even with substantial computational resources as is employed in attempted codebreaking of public key systems Accordingly, configurations herein substantially overcome the shortcomings presented above from a limited set of code invariants by employing code invariants including opcodes and register references to enlarge the set of invariants from which the corresponding cipher table and resulting alphabet are drawn. Inclusion of opcodes as code invariants results in a more robust steganographic cipher because registers are equivalent in that one can be substituted for another. For opcodes no such equivalence exists, thus opcodes cannot be exchanged or substituted without altering operation. Registers are subject to the vulnerability that consistent substitution of registers (i.e. replace 'register 3' references with 'register 6'), thus changing code values while allowing similar function, allows a malware proponent to inject code that is functionally equivalent yet has different instruction values to elude detection. For example, polymorphic viruses such as Conficer avoid detection by conventional malware techniques by consistently evolving such that their presence cannot be ascertained merely by comparison to a previously gathered string, or instance of the virus.

In further detail, configurations disclosed herein include a method for authenticating a code sequence using steganographic messages by identifying a set of invariants in a code segment defining an instruction sequence, the invariants corresponding to fixed values in the instruction sequence, and defining, in a symbol table, an entry for each invariant, in which each entry is for associating an invariant symbol with a set of message symbols for defining a message. The method associates each message symbol in the message with a successive invariant symbol in the code segment, and adds, for each association, the message symbol to the set of message symbols corresponding to the successive invariant symbol. Parsing of the message continues for associating a sequence of the message symbols defined by the message with a sequence of the successive invariants in the code segment, and a repository maintaining the message for subsequent authentication of the code segment, such that the code segment is authenticatable by verifying that each message symbol in the message corresponds to the set of message symbols associated with the corresponding invariant symbol, the correspondence determined from a corresponding position in each respective sequence of message symbols and invariant symbols as defined by the stored mapping Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
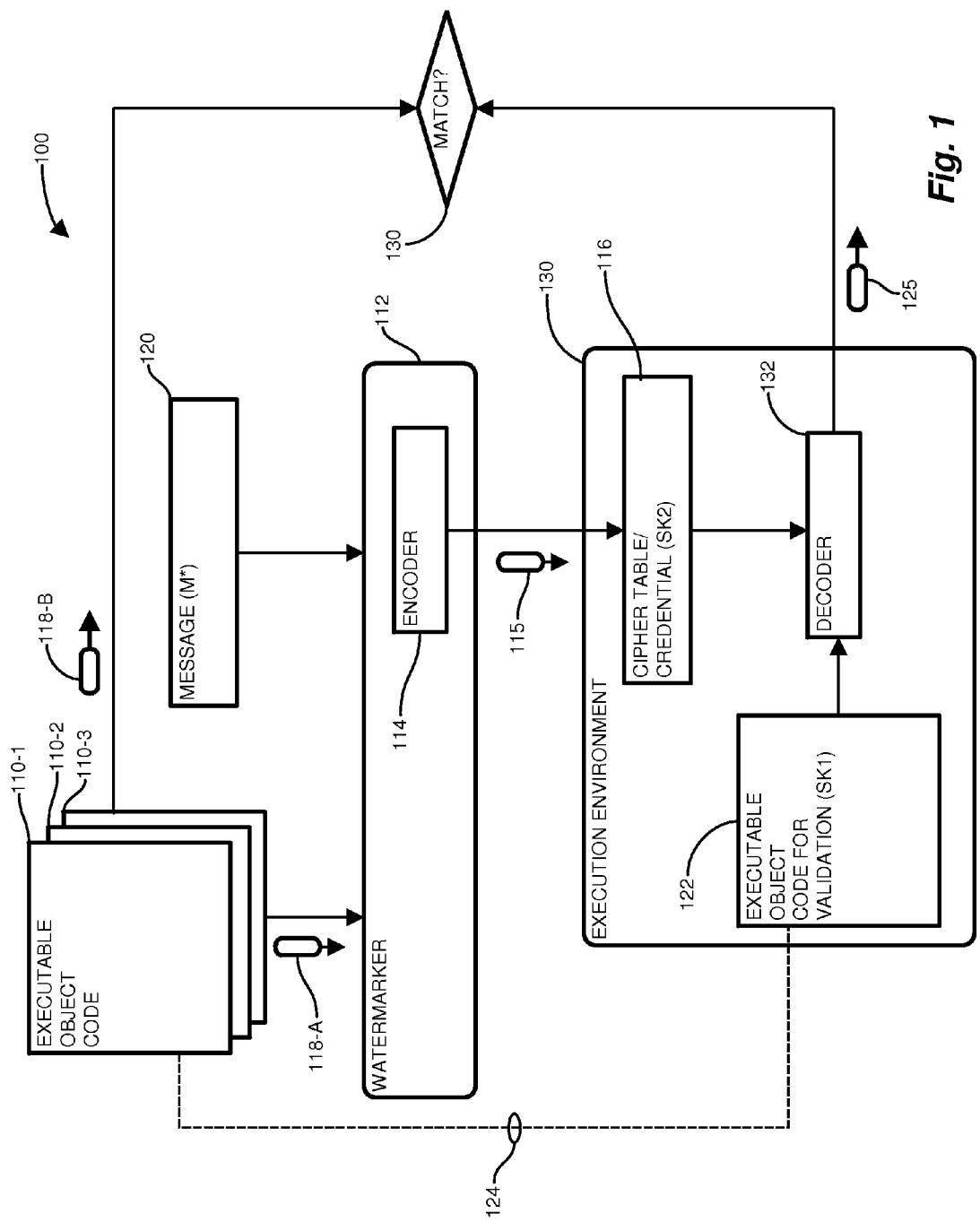
FIG. 1 is a context diagram of an information processing environment suitable for use with configurations herein.

Watermarking techniques, already widespread to prevent unauthorized duplication of financial instruments such as checks and currency, are also employed in an electronic context. For publishers of document based materials, watermarks gained popularity as a mechanism of deterring unauthorized duplication. Once employed only for physical copies of government issued instruments, such as drivers licenses and currency, the concept has been adapted for electronic media. A watermark is an embedded token in a document to identify the origin of the particular copy or instantiation. While a watermark may be visible or hidden, a common premise is that substantial effort is required for duplication of the content without also duplicating the watermark. Hence, the watermark is carried with successive instantiations to maintain the tie to the original source. Visible watermarks are visible in a rendered copy, often as a diagonal half tone phrase or insignia across a rendered area.

Steganography may be described as a manner of hiding information by covertly embedding messages within other messages. What distinguishes steganography from other forms of information hiding is the focus on merely detecting the presence of a hidden message. Watermarking and fingerprinting are two different problems of information hiding, where the existence of a hidden message is public knowledge. The focus in these areas is on hiding the message in perceptual data from an observer that is typically a human, and on embedding the message robustly so that it cannot be removed without significantly distorting the data itself. The difference between watermarking and fingerprinting is that watermarking supplies digital objects with an identification of origin and all objects are marked in the same way; fingerprinting, conversely, attempts to identify individual copies of an object by means of embedding a unique marker in every copy that is distributed to a user.

Other techniques incorporate specific functionality as additional source, intermediate or executable code to monitor execution. However, these techniques are detectable in the executable via differential steganalysis techniques because they alter the code footprint and its execution topology.

As described above, code signing and other encryption techniques have been in widespread use for decades but little has been done with steganography to prevent malware execution. In practice, previous steganographic software protection methods for object code have used a rearrangement or replacement of instructions. Usually the performance impact from this rearrangement is small but it may be significant especially in performance sensitive applications as well as again lending itself to detection and circumvention via differential steganalysis.

An alternative approach registers, can be renumbered or rewritten to create a stegotext and avoid performance impacts, as discussed in the aforementioned U.S. patent. However, there are only a few ways one can rearrange or substitute instructions, utilize condition codes or renumber registers and still achieve the same computational result. These constraints significantly reduce the information entropy, i.e., the amount of information that can be conveyed per unit of executable code, thus limiting their utility.

In addition, differential steganalysis, comparing two code sections or their physical characteristics or performance may be used to determine the probable existence of a watermark. These stegosystems are thus considered only computationally or statistically secure.

A particular constraint on watermarking to protect executable code during execution is the format of the object code instructions themselves. Unlike digital media and audio signals, there are few unused bits in an object code instruction, so little additional information can be encoded beyond that necessary to directly execute the instruction. The disclosed method doesn't suffer from this constraint because the code segment sought to be protected, or "watermarked", remains unmodified. The disclosed encoding process creates an alternative set of semantics or meaning for an executable code segment. This encoding process is used to create a "watermark" or "fingerprint" from the executable code without modifying the executable code segment itself. Beyond forming the basis for establishing a unique software identity for the executable code segment, the watermark may be used as a key to obtain further information which may further be concealed cryptographically, i.e., a "payload" or hidden message.

The disclosed method of watermarking executable code may be performed during any lifecycle stage when executable code segment is available. This includes through the compiler at code generation; during packaging; prior to encryption or code signing for transport; after decryption on reception; during movement to storage or even linking/loading prior to execution.

FIG. 1 is a context diagram of an information processing environment 100 suitable for use with configurations herein. Referring to FIG. 1, the information processing environment 100 includes code segments 110-1 . . . 110-3 (110 generally) of executable object code for validation and authentication as disclosed herein. As is known in the art, an executable code 110 segment includes sequences of opcodes, or invariants, discussed further below, that retain value through memory relocation during linking and loading on the execution machine. When parsed in order, a sequence of invariants 118-A results, in which each invariant is defined by an invariant symbol such as an opcode. A watermarker 112 includes an encoder 114 for generating a cipher table 116 for mapping symbols. A message 120 (M*) defines a sequence of symbols, such as a text string, for encoding with the sequence of invariants.

Through the encoding, discussed further below, the encoder 114 maps each symbol in the message 120 to each invariant in the sequence of invariants 118-A. Each association 115 of a message symbol to an invariant is expressed through a mapping defined in the cipher table 116, which operates as a second credential SK2 in authentication of the object code 110, which defines a first credential (SK1). Since the invariants do not change during relocation, loading, and execution, an executable object for validation 122 will have the same sequence of invariants as the corresponding executable object code 110 from which the cipher table 116 was generated, as shown by dotted line 124. In an execution environment 130, a decoder 132 maps each instruction from the executing code 122 during execution. The decoder 132 decodes each invariant to the corresponding message 120 symbol. If the invariants in the executable object 122 are unchanged, each decoder result 125 will match 130 the corresponding invariant 118-B, discussed further below.

As illustrated in FIG. 1, the executable code 110 initially serves as a covertext, as described above, provided to the watermarker 112 which analyzes the executable code 110 to determine its structure, the invariants it contains and their sequence. For example, the executable code 110 may be disassembled from its binary format using commercially available dis-assemblers, debuggers or utility software and possibly using additional information usually contained in header files or debugging databases. The executable code segment 110 (code segment) is provided to the encoder 114 where all or a subset of the invariants 118-A may be chosen to comprise the watermark or only a portion of the executable code segment may be selected to contain the watermark.

The encoder 114 accepts the hidden message (m*) and binds the sequence of symbols in m* to the sequence of invariants encountered in the executable code segment covertext 110. Thus the invariants establish an alphabet representing the hidden message, (m*) represented by a translation table containing a nom-injective mapping (many-to-many) of invariants to symbols known as a cipher table 116.

The elements of the hidden message (m*) need not be restricted to single symbols but rather can represent any information in an arbitrary format. For example, the "symbols" may be binary numbers whose magnitude may be limited only by the storage capacity of the execution platform.

The watermarking process creates a credential (sk2) containing the cipher table 116. The credential comprises the second component, (sk2), of the dual key steganographic cryptosystem disclosed.

The credential need not contain the hidden message itself as this can be "recognized" during execution by dereferencing invariants through the Cipher Table, The unmodified executable code 110 is now a stegotext containing a watermark representing the hidden message 120 (m*). Knowledge of only the stegotext 110 (sk1) or only the cipher table 116 (sk2) provides insufficient information to ascertain m* 120. Therefore, the disclosed arrangement comprises a split-key steganographic cryptosystem for protecting executable code segments applicable to any computing architecture with an instruction format containing invariant components. The inability to determine whether an arbitrary executable code segment is a covertext or a stegotext given unbounded computational power and unlimited time has been shown by Cachin, Christian, 1998, *Digital Steganography*, In Proc. 2nd Workshop on Information Hiding, Lecture Notes in Computer Science, vol. 1525, Springer, (1998), to be an instance of perfectly secure steganography.

The watermark contained in the stegotext (executable code segment 110) represented by the alphabet in the credential (SK2) comprises a fragile software identity in that any modification of the sequence of invariants in the executable code makes it incompatible with the cipher table 116 and indicates tampering or foreign code. The hidden message 120 (m*) may contain platform-specific information such as license keys or other information linking the executable code to a specific platform. If the executable code segment 110 is altered to remove this information or the credential has been removed or altered then inappropriate use may be suspected. It is this fragility that makes it useful in detecting and preventing malware execution and software piracy.

When the disclosed steganographic cryptosystem is used to detect tampering or foreign code, the recognizer uses the credential (SK2) to verify the integrity of the watermark by comparing the hidden message 120 to the results of the recognition decoding. If both the executable code 110 (SK1) and the credential 116 (SK2) are intact and unmodified then the watermark integrity is verified.

Figure 2:
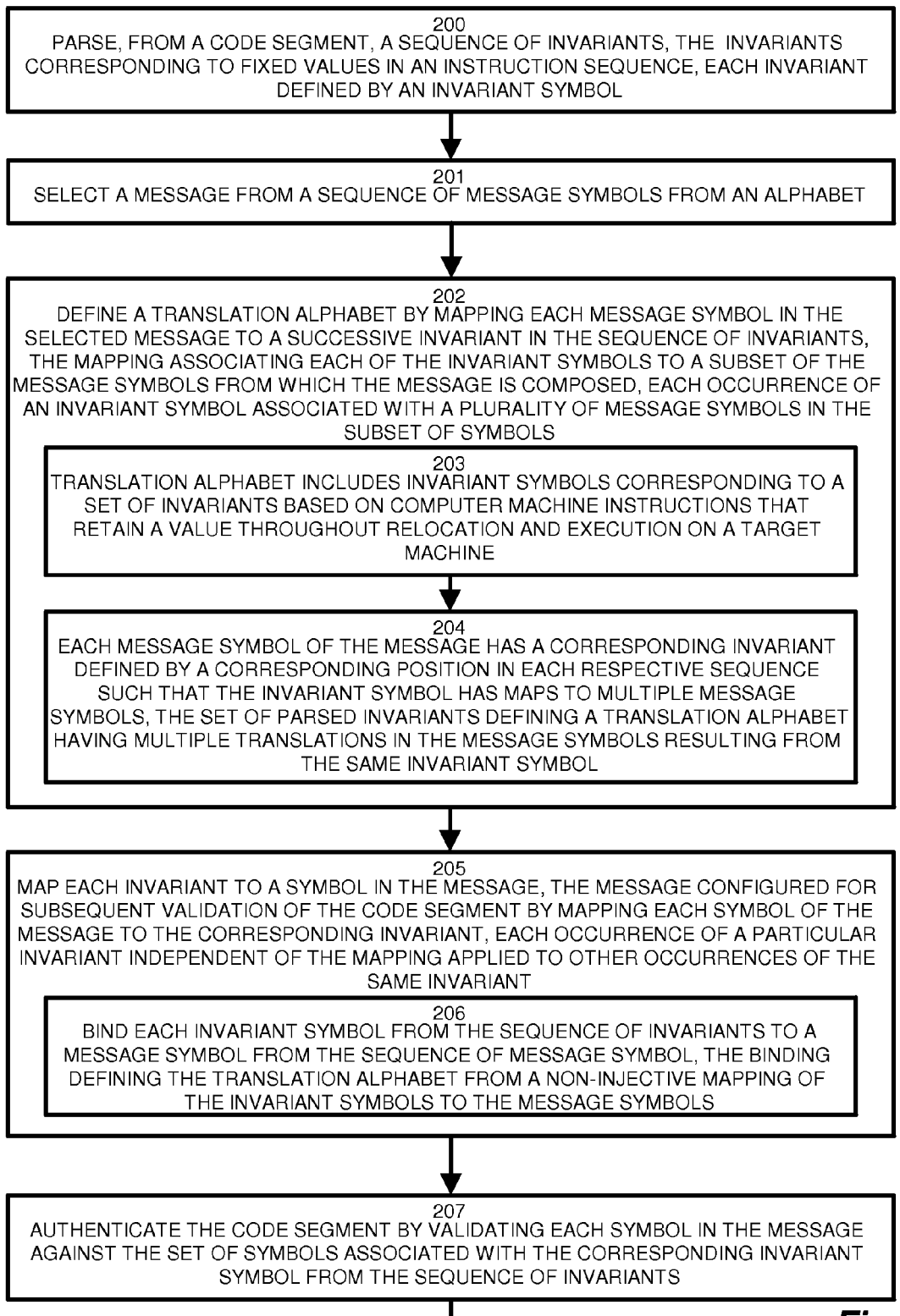
FIG. 2 is a flowchart of the steganographic watermarking method in the environment of FIG. 1.

FIG. 2 is a flowchart of the steganographic watermarking method in the environment of FIG. 1. Referring to FIGS. 1 and 2, at step 200, the method for encoding steganographic messages includes parsing, from a code segment, a sequence of invariants, in which the invariants correspond to fixed values in an instruction sequence and each invariant is defined by an invariant symbol. In the example arrangement, the invariants include machine instructions and register references that are not relocated during compiling, linking and loading, and the invariant symbol is the assembler opcode denoting the instruction or operand. A message for encoding is selected from a sequence of message symbols from an alphabet, as depicted at step 201. In the example arrangement, the encoded message 120 is a conventional phrase in a Graeco-Roman alphabet. The encoder 114 defines a translation alphabet by mapping each message symbol (i.e. character) in the selected message 120 to a successive invariant in the sequence of invariants from the executable object code 110, such that the mapping 116 associates each of the invariant symbols to a subset of the message symbols from which the message 120 is composed, in which each occurrence of an invariant symbol is associated with a plurality of message symbols in the subset of symbols, as disclosed at step 202. In conventional ciphers, each symbol relates to a single character or symbol in the translation alphabet, defining a one-to-one or onto relation that is deterministic forward and backward.

In the disclosed configuration, as discussed above, the translation alphabet includes invariant symbols corresponding to a set of invariants based on computer machine instructions that retain a value throughout relocation and execution on a target machine (i.e. execution environment 130), depicted at step 203. Each message symbol of the message 120 (i.e. character) has a corresponding invariant (assembler mnemonic) defined by a corresponding position in each respective sequence such that the invariant symbol has maps to multiple message symbols, such that the set of parsed invariants defines a translation alphabet having multiple translations in the message symbols resulting from the same invariant symbol, as depicted at step 204. The sequence of invariants thus defines a message in a parallel alphabet but in which each invariant symbol occurrence maps to different symbols in the message 120.

Each computer architecture uses a specific format for its executable code instructions. Even very similar architectures may have considerable differences in executable code instructions and their formats. Generally, each instruction is a sequence of bit patterns representing components of the instruction such as operation codes (opcodes), registers, values or addresses and address offsets. Some of these patterns are invariant because the instruction components they represent such as opcodes and registers are not modified when the executable code segment is loaded into memory for execution or during execution itself. Moreover, slight changes to these invariants almost always change the computational activity of the instruction. These changes are the primary vector for introducing malware into an executable code segment.

From the translation alphabet, defined as a set of invariants recognized in the code segment 110, the encoder builds a credential 116 for mapping each invariant to a symbol in the message 120, in which the message is configured for subsequent validation of the code segment 110 by mapping each symbol of the message 120 to the corresponding invariant, such that each occurrence of a particular invariant is independent of the mapping applied to other occurrences of the same invariant, as shown at step 205. In the example arrangement, the credential takes the form of a cipher table (116, FIG. 3), or symbol table, that binds each invariant symbol from the sequence of invariants to a message symbol from the sequence of message symbols, the binding defining the translation alphabet from a non-injective mapping of the invariant symbols to the message symbols.

The cipher table (credential) 116 and message 120 thus define credentials for authenticating the corresponding code segment 110. Modification of the code segment 110 that disrupts the invariants will cause the mapping to fail to find the sequence of invariants corresponding to the message 120. Accordingly, at a subsequent time at which code segment 110 authentication or validation is desired, the decoder authenticates the code segment for validation 122 by validating each symbol in the message 120 against the set of symbols (via cipher table 116) associated with the corresponding invariant symbol from the sequence of invariants, as depicted at step 207.

In the example arrangement, using the Graeco-Roman alphabet message for authentication against the steganographic message defined by the invariant sequence, authenticating the code segment includes retrieving the message, parsing each invariant from the code segment, and identifying the set of symbols to which each parsed invariant corresponds, as each invariant symbol occurrence in the sequence does not necessarily map to the same message symbol. The decoder comparing, in an iterative manner, each successive symbol of the message to the set of symbols corresponding to each successively parsed invariant, i.e. first to first, second to second, etc., and confirming if each successive symbol is in the set of symbols corresponds to the respective parsed invariant, discussed further below with respect to FIG. 3.

Figure 3:
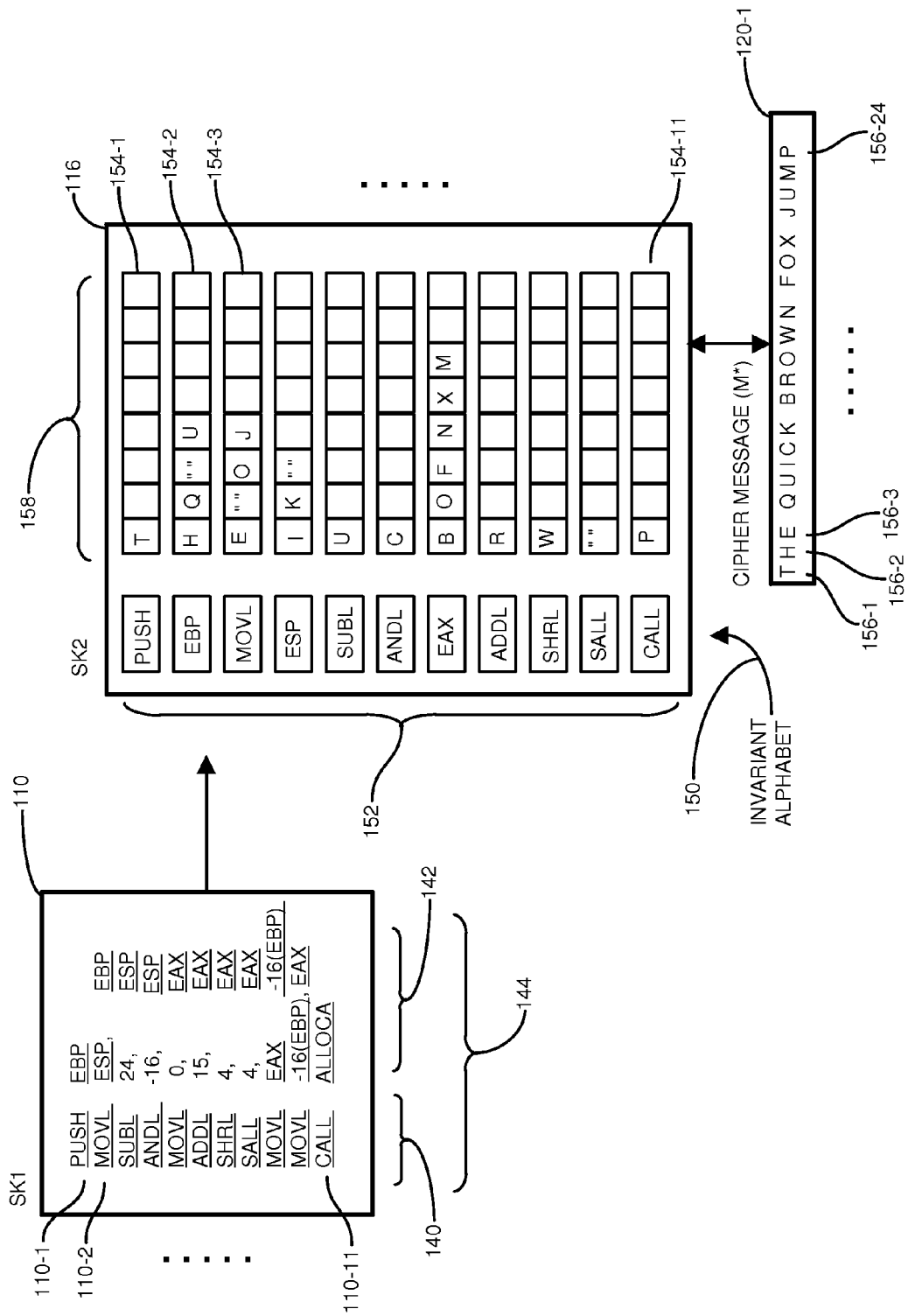
FIG. 3 is a diagram showing steganographic watermark generation as defined in FIG. 2.

FIG. 3 is a diagram showing steganographic watermark generation as defined in FIG. 2. Referring to FIGS. 1 and 3, a code segment 110 includes a sequence of opcodes 140 and operands 142. The exact format and value varies depending on architecture, but in general each 140 opcodes expects a number of 142 operands. Both 140 opcodes and operands 142 may be invariants 144 (underlined operands and opcodes), meaning that their value does not change in response to compiling and linking. In contrast, some operands are relocatable, meaning that they employ a value relative to a memory page or stack location, and thus change value from one instantiation to another.

Each invariant 144 of the executable code 110 may be represented by an invariant symbol 150 in the cipher table. The set of invariant symbols 152 defines an alphabet from which to compose a steganographic message. For each invariant symbol 150, a cipher table entry 154-1 . . . 154-11 (154 generally) includes a set 158 of each message symbol 156 associated with that invariant symbol 150. Generating the cipher table 116, more generally referred to as a symbol table to denote mapping between alphabets (set of invariants 152 and message symbols 120-1), includes mapping each message symbol (i.e. character) 156-1 . . . 156-24 (156 generally) from the message 120-1 to a corresponding entry 154 for the invariant occurring in that position. For example, beginning with the first symbol 156-1 of the message 120-1, message symbol 156-1 ("A") is associated to the first invariant PUSH from line 110-1. The message symbol "T" 156-1 is added to the entry 154-1 for the message symbol 150 for PUSH. The second message symbol 156-2 associates with the $2^{nd}$ invariant EBP, also from line 110-1, thus storing the message symbol "H" (156-2) in entry 154-2. Third message symbol "E" (156-3) associates with MOVL, from code segment line 110-2, to add "E" to entry 154-3. Continuing parsing on line 110-2, ESP maps to entry 154-3 for storing message symbol 156-4 (" "). Message symbol 156-5 associates "Q" with EBP, also in line 110-2. As there is already an entry 154-2 for EBP, message symbol 156-5 adds "Q" to entry 154-2. It should be noted that the set 158 of entries associated with an invariant symbol 150 is one of inclusion only, and not an ordering of the appearance of the message symbols within it. The encoder 114 associates the remaining message symbols 156 to the invariants 144 in corresponding positions, and the association mapped in the entry 154 for the corresponding invariant symbol 150.

Upon completion, the steganographic message 120-1 is encoded in the code segment 110, while leaving the code segment 110 unchanged, by mapping the invariant symbols 150 to message symbols 156, therefore defining a translation between the alphabet of symbols (invariants 152 and conventional ASCII) from which each is composed. It should be further noted that mere knowledge of only one credential (symbol table 116 or message 120-1) is insufficient to derive the message from the code segment 110; both must be employed in a validation attempt. The strength of the protection lies in the fragility of the steganographic message. It is very difficult and highly unlikely that a modification could be made to the ordered invariants 110 (stegotext) and not disrupt the computed steganographic message 120 mapped to the invariants.

The executable code 110 of FIG. 3 presents a mnemonic form example of executable code (X86/AT&T syntax) bound through the cipher table 116 to represent a hidden message (m*) as a many-to-many or non-injective (many-to-many) mapping of invariants to hidden message symbols. During the watermarking process our method uses these invariants as an alphabet to steganographically represent information to be transmitted between the water marker (encoder) 114 and the decoder 132, Thus the watermarking process transforms the executable code from a cleartext into a stegotext containing hidden information without modifying the executable code itself or its execution topology.

Recognizing a watermark and decoding its hidden message uses the invariants in identified in each machine instruction an index into the cipher table 116. Subsequently, it must be determined that a symbol represented by that invariant is the correct one for that point in the hidden message (m*).

The disclosed steganographic cryptosystem may be applied to any computing architecture wherein executable code instructions contain invariants that enable the creation of an alphabet independent of the actual computing architecture. In this section we describe an example the, without limitation, demonstrates the utility of our steganographic cryptosystem in preventing the execution of foreign code.

All or portions of an executable code segment may be watermarked. Each portion might contain only certain functions or routines. These can be selected either by a user such as a security engineer or in an automated fashion by an analysis program such as a debugger or reverse engineering algorithm. Each watermarked portion would have a potentially unique credential. For example each of these credentials might use a different set of invariants and a different hidden message. The use of multiple credentials per executable code segment increases the complexity of the watermark and further enhances the security of the watermarking process since each credential would be statistically unrelated to another. This use of composite watermarks forms the basis of a "one time pad" cryptographic approach, discussed further in Cachin, cited above and discussed further below with respect to FIG. 4.

The recognition of these composite credentials is straightforward. During execution a recognition program is invoked when certain conditions are met such as particular actions are requested by an executing software application. An example of these trigger events is kernel level system services requests by the watermarked application. When these triggers are invoked the recognition program determines which, if any, credential should be used to decode the watermark. This can be accomplished using virtual address or other information usually used to manage the virtual address space of the executing program.

The credential associated with the particular portion of the executable code segment is retrieved from a potentially secure storage space using any suitable method. The credential is then used to verify the integrity of the watermark. If the watermark is valid, invalid or doesn't exist different actions may be taken based on "response rules" maintained in a policy management system.

The execution of a program often requires the traversal of a call graph wherein different portions of the executable code are executed in response to control transfers created by one portion of the program "calling" another portion or perhaps a different program altogether. These control transfers often suspend execution of the "calling" code segment and return control to it after the "called" code segment has completed its execution path. In particular configurations, the recognition of watermarks in any portion of executable code in response to a triggering event may initiate the recognition of watermarks on all or a subset of the suspended "calling" routines. In this way all "active" portions of a watermarked executable may be recognized whenever recognition is triggered on any portion of watermarked executable code. This enables detection and prevention of so-called run time buffer overflow attacks wherein the "call chain", the addresses or stack frames of suspended executable code segments, are contaminated by foreign code. For example, it is common practice in operating system kernels to use a stack-based data structure to contain "stack frames", data structures containing return addresses and other information used to maintain proper execution sequencing among execution and suspended executable code segments. When a recognition program is triggered it can deference stack frames on both the kernel and/or the application stack to determine what executable code segments should be have their associated credentials retrieved and watermarks versified. This technique will prevent the execution of the common buffer overflow vulnerability.

Figure 4:
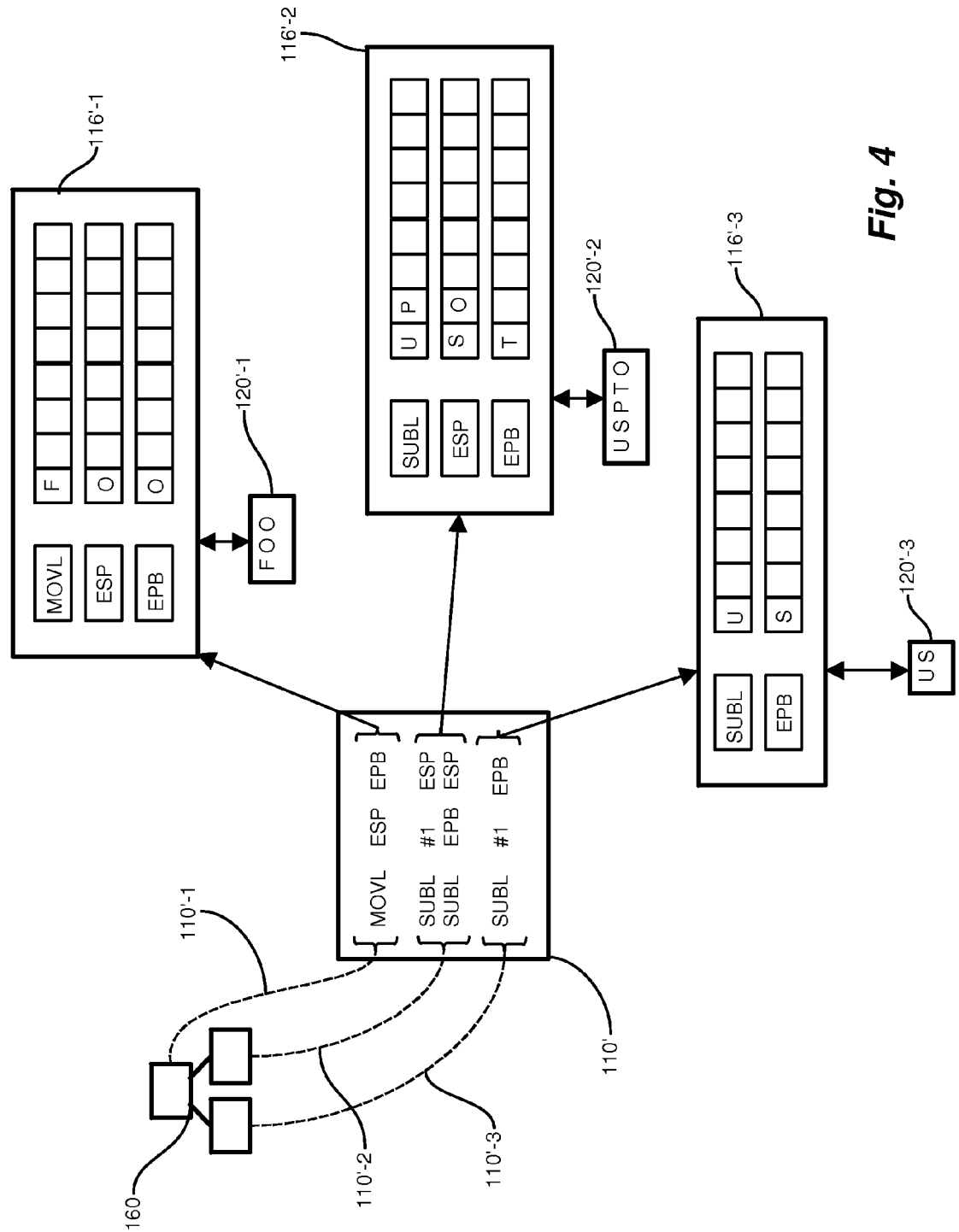
FIG. 4 shows the many-to-one mapping of a message symbol for a composite watermark as in FIG. 3.

FIG. 4 shows the mapping between the symbol alphabets of FIG. 3 using a composite watermark for showing non-deterministic (many to many) mapping between symbols in different alphabets. A call graph may be represented as a directed graph or tree illustrating conditional branching in the code segment. Each edge of the graph illustrates a portion corresponding to the invariants defining the sequence for that branch. A composite watermark associates a message and corresponding cipher table with each portion, or combination of portions, to be employed when the code execution takes the path corresponding to those portions.

Figure 5:
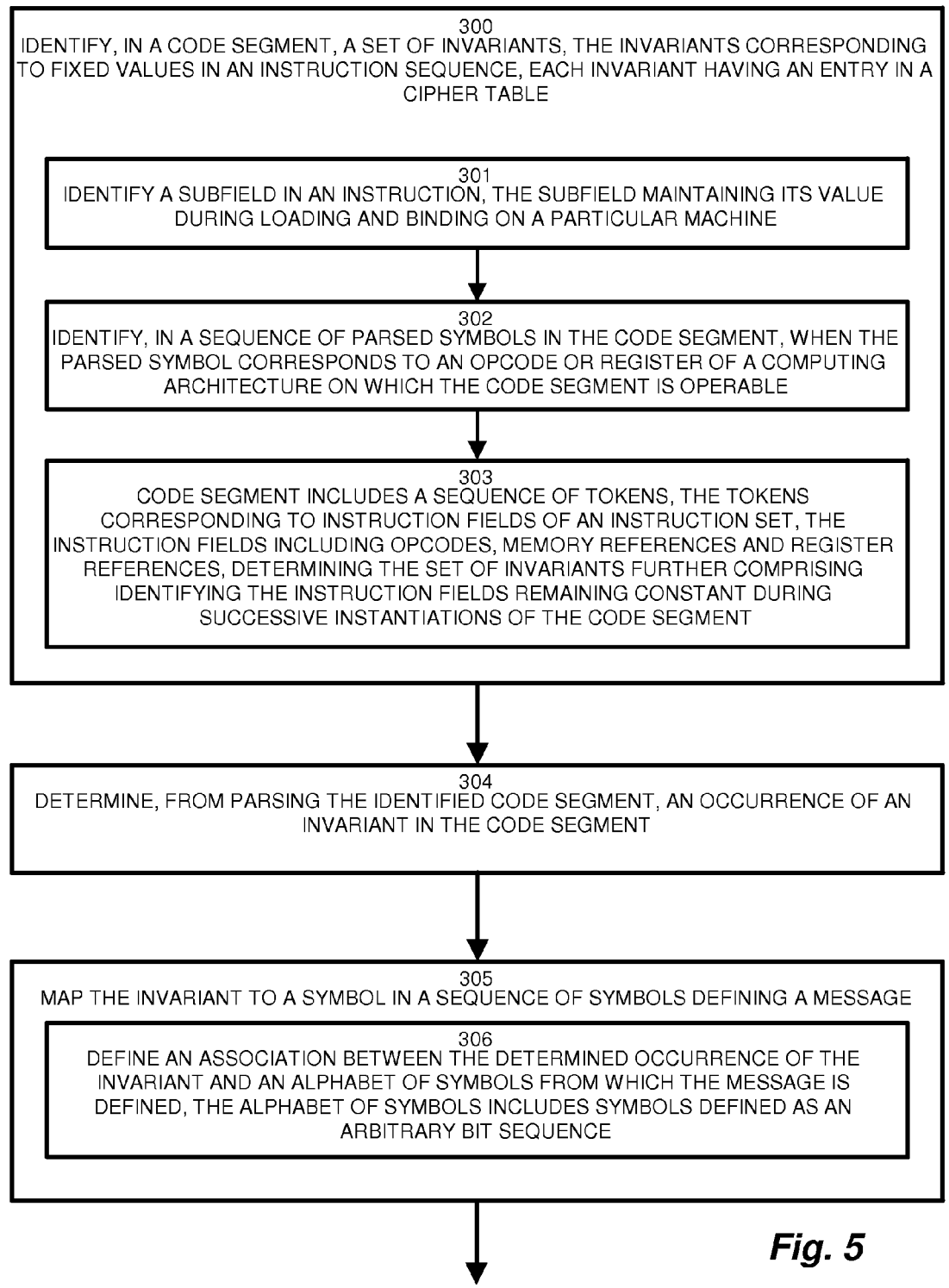
FIGS. 5-7 show a flowchart of steganographic watermark generation and validation as disclosed in FIGS. 3-4.

Referring to FIGS. 1, 3 and 4, code execution may be represented as a call graph 160 indicative of conditional and unconditional transfers of control between code segments 110'-1 . . . 110'-3 (110' generally). Each code segment 110' may correspond to a credential pair represented as a message 120 and cipher table 116, collectively referred to as a composite watermark. Referring to FIG. 5, the call graph 160 denotes code segments 110'-1 . . . 110'-3. Each code segment 110' has a corresponding message 120'-1 . . . 120'-3 (120' generally) and cipher table 116'-1 . . . 116'-3 (116' generally).

The set of credentials 116', 120' define a composite watermark, in which the composite watermark is defined by a plurality of watermark messages 120' corresponding to a respective plurality of invariant sequences 110', such that parsing includes selectively identifying a particular sequence of invariants based on conditional or invoked execution of portions of the code segment 110', and identifying a cipher table 116' corresponding to the parsed sequence 110'. For each segment 110' the watermarker 112 maps the invariants 150 to the identified cipher table 116' to yield the authentication message 120', and compares the authentication message 120' to the watermark corresponding to the respective invariant sequence, as disclosed above. The watermarker 112 identifies a call graph 160 defined by selective invocation of conditional or unconditional code segments 110', such that the call graph 160 is indicative of a transfer of control to a different stack based call frame. Such transfers may be conditional or absolute, and may be imposed from either the source code or compiler operation. The decoder 132 invokes identification of the sequence of invariants 150 based on the transfer of control from the call graph 160, such that the code segment 110' is relative to the stack based call frame from the control transfer. As above, the decoder compares the mapped invariants 150 including instructions referenced from the stack based call frame, and employs a watermark corresponding to the conditional code segment 110' such that modifications to stack based call frame instructions are included in the watermark comparison.

A further aspect shown is many to many mapping of invariants 150 to message symbols 156. Segment 110'-1 maps occurrences of message symbol "O" to invariants "ESP" and "EPB", thus "O" may refer to either ESP or EPB in the invariant sequence. Conversely, code segment 110'-2 maps "U" and "P" to SUBL, and maps "S" and "O" to ESP, thus invariant SUBL may correspond to either U or P, and invariant ESP may correspond to either S or O. There is not a consistent substitution of a symbol in one alphabet to stand for the same symbol in a parallel alphabet.

Figure 6:
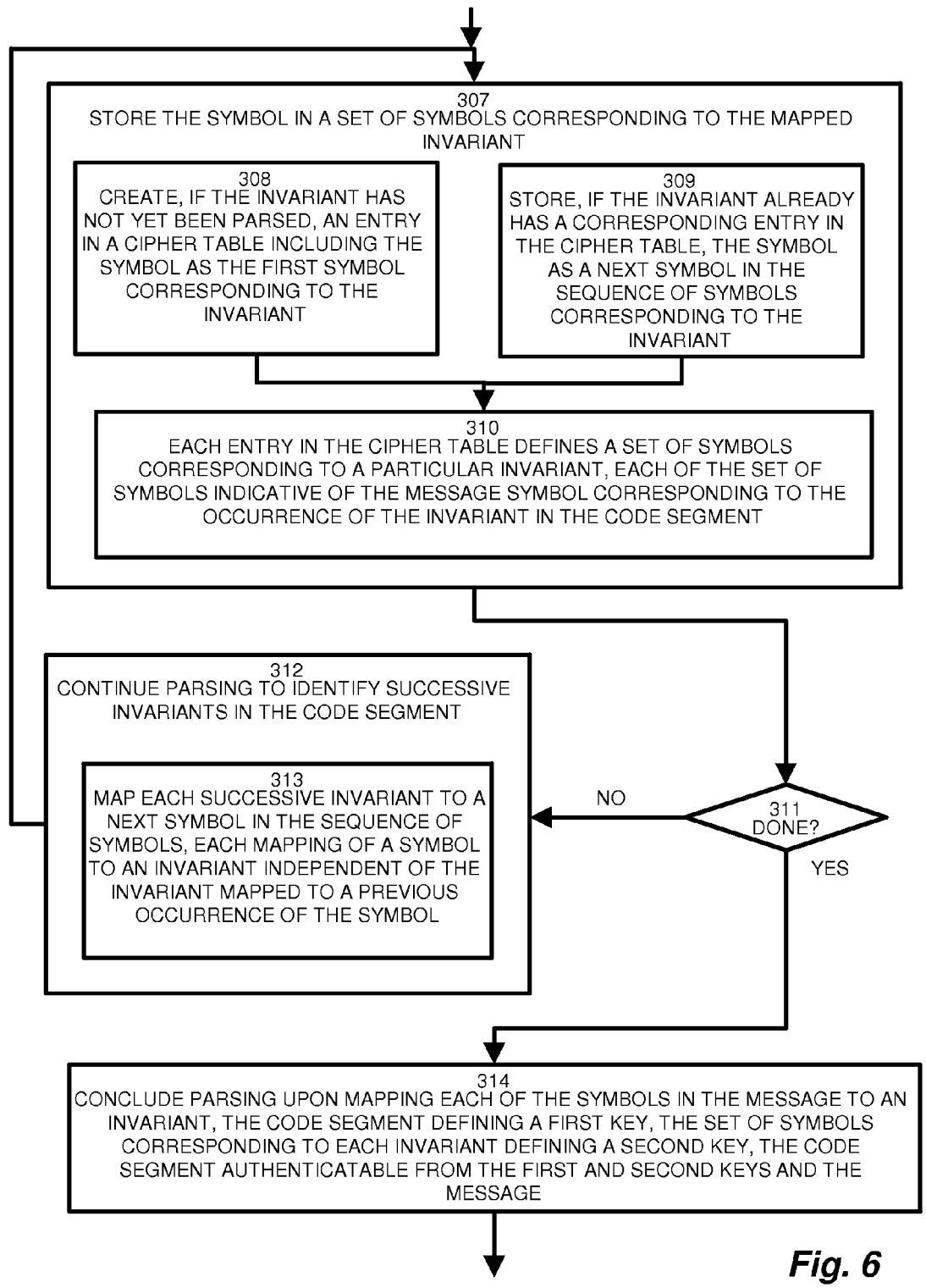
Figure 7:
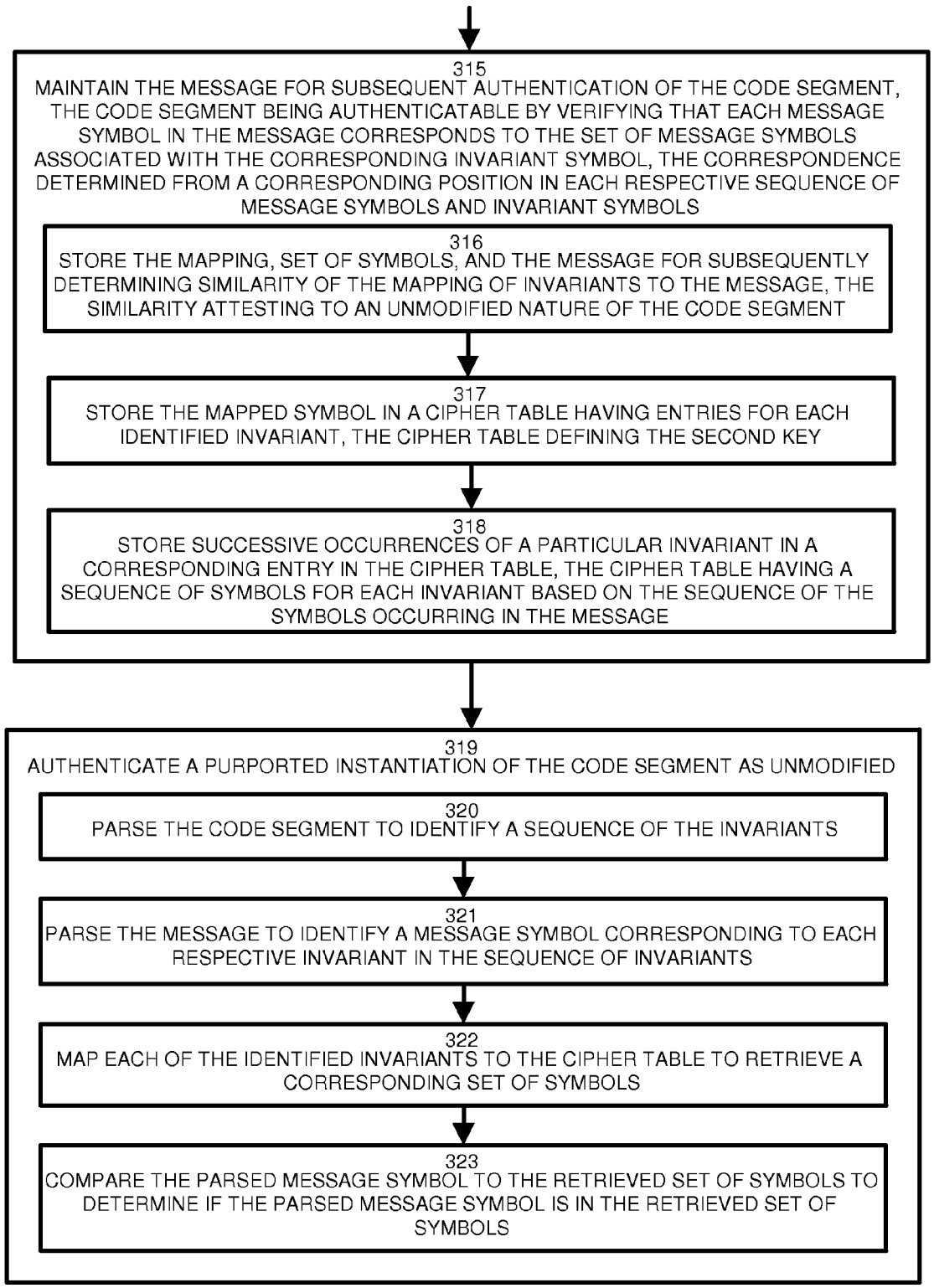

FIGS. 5-7 show a flowchart of steganographic watermark generation and validation as disclosed in FIGS. 3-4. Referring to FIGS. 3-7, at step 300, the method for encoding steganographic messages by invariant recognition as defined herein includes identifying, in a code segment 110, the set of invariants 152, such that the invariants correspond to fixed values in an instruction sequence, for which each invariant 150 has an entry 154 in a cipher table 116. Identifying the invariants further includes identifying a subfield in an instruction, such that the subfield maintains its value during loading and binding on a particular machine in the execution environment 130, as depicted at step 301. In the example configuration, identifying the invariants includes identifying, in a sequence of parsed symbols in the code segment 110, when the parsed symbol corresponds to an opcode 140 or register operand 142 of a computing architecture 130 on which the code segment 110 is operable, as shown at step 302, as opcodes and registers typically retain value throughout the binding process. The code segment 110 therefore includes a sequence of tokens 144, the tokens 144 corresponding to instruction fields of an instruction set, in which the instruction fields include opcodes 140, memory references and register references (denoted as operands 142), such that determining the set of invariants 150 is performed by identifying the set of instruction fields 152 remaining constant during successive instantiations of the code segment 110, as depicted at step 303.

From the set of available invariants 152, the watermarker 112 determines, from parsing the identified code segment 110, an occurrence of an invariant 150 in the code segment 110, as disclosed at step 304. The encoder 114 maps the invariant to a symbol 156 in a sequence of symbols 120-1 defining the message, as disclosed at step 305. Mapping further includes defining an association between the determined occurrence of the invariant 150 and an alphabet of symbols 156-N from which the message 120-1 is defined, such that the alphabet of symbols includes symbols defined as an arbitrary bit sequence such as an ASCII string, as discussed at step 306.

For each association, the encoder 114 stores the symbol 156-N in a set of symbols 158 corresponding to the mapped invariant 150, as shown at step 307. This includes, at step 308, creating, if the invariant 150 has not yet been parsed, an entry 154 in the cipher table 116 including the symbol 156 as the first symbol corresponding to the invariant 150, and storing, if the invariant 150 already has a corresponding entry 154 in the cipher table 116 (denoted by invariant symbol 152), the symbol 156 as a next symbol in the sequence of symbols 158 corresponding to the invariant 150, as depicted at step 309. The result is that each entry 145 in the cipher table 116 defines a set of symbols 156 corresponding to a particular invariant 150, such that each of the set of symbols 158 is indicative of the message symbol 1156 corresponding to the occurrence of the invariant 150 in the code segment 110, as disclosed at step 310.

A check is performed, at step 311, to determine if all message symbols 156 have been encoded, and the watermarker 112 continues parsing to identify successive invariants 150 in the code segment 110, as depicted at step 312. This includes mapping each successive invariant 150 to a next symbol 156 in the sequence of symbols 120-1, such that each mapping of a symbol 156 to an invariant 150 is independent of the invariant 150 mapped to a previous occurrence of the symbol 156, as depicted at step 313. For example, in the configuration shown in FIG. 3, the entry 154-3 shows that the MOVL invariant symbol maps to either "E", "<sp>", "O" or "J" at different positions in the message 120-1.

The watermarker 112 concludes parsing upon mapping each of the symbols 156-1 in the message 120-1 to an invariant 150, such that upon completion, the code segment 110 defines a first key (SK1), and the set of symbols 158 corresponding to each invariant 150 defining a second key (SK2) such that the code segment 110 is authenticatable from the first and second keys and the message 120, as disclosed at step 314.

The execution environment 130 or other suitable storage mechanism then maintains the message 120 for subsequent authentication of the code segment 110, in which the code segment 110 remains authenticatable by verifying that each message symbol 156 in the message 120-1 corresponds to the set of message symbols 158 associated with the corresponding invariant symbol 150, such that the correspondence is determined from a corresponding position in each respective sequence of message symbols 120-1 and invariant symbols 110, described at step 315. The execution environment 130 stores the mapping 158, set of symbols 152, and the message 120 for subsequently determining similarity of the mapping of invariants 150 to the message 120, in which the similarity attests to an unmodified nature of the code segment 110 when the invariant sequence maps to the same message 120, as depicted at step 316. Storing further includes storing the mapped symbol 156 in the cipher table 116 having entries 154 for each identified invariant 150, such that the cipher table defines the second key (SK2), as disclosed at step 317. Storing further includes storing successive occurrences of a particular invariant 150 in a corresponding entry 154 in the cipher table 116, in which the cipher table has a sequence of symbols 158 for each invariant based 150 on the sequence of the symbols 156 occurring in the message 120-1, as shown at step 318.

The cipher table (symbol table) 116 and message 120 are retained until subsequent authentication is desired. At step 319, the decoder authenticates a purported instantiation of the code segment 122 as unmodified, as depicted at step 319, such that authenticating includes parsing the code segment 122 (note that the executable object code for validation represents a loaded, executing code segment relying on the unchanged value of the invariants to correspond to the object code 110 from which the cipher table 116 was generated, as shown by dotted line 124) to identify a sequence of the invariants 150, as shown at step 320. The decoder 132 parses the message 120 to identify a message symbol 156 corresponding to each respective invariant 150 in the sequence of invariants from the code 122, as depicted at step 321, and maps each of the identified invariants 150 to the cipher table 116 to retrieve a corresponding set of symbols 158, as disclosed at step 322. The decoder 132 compares the parsed message symbol 156 to the retrieved set of symbols 158 to determine if the parsed message symbol 156 is in the retrieved set of symbols 158, indicating a correspondence to the original message, as depicted at step 323. Correspondence of all symbols 156 to respective invariants 150 attests to untampered code 122; a mismatch indicates an altered invariant order and thus modifications to the code.

Those skilled in the art should readily appreciate that the programs and methods for implementing a steganographic messaging system using code invariants as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a non-transitory computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for implementing a steganographic messaging system using code invariants has been particularly shown and described with references to embodiments thereof, it will be understood by those skilled in the art that various changes in form and details may be made therein without departing from the scope of the invention encompassed by the appended claims.

What is claimed is:

1. A method for encoding steganographic messages comprising:
    parsing, from a code segment, a sequence of invariants, the invariants corresponding to fixed values in a microprocessor instruction sequence, each invariant defined by an invariant symbol;
    selecting a message from a sequence of message symbols from an alphabet; and
    defining a translation alphabet by mapping each message symbol in the selected message to a successive invariant in the sequence of invariants, the mapping associating each of the invariant symbols to a subset of the message symbols from which the message is composed, the mapping defining the message in the unmodified sequence of invariants from the code segments that leaves the instruction sequence unchanged, each occurrence of an invariant symbol associated with a plurality of message symbols in the subset of symbols.

2. The method of claim 1 further comprising
    binding each invariant symbol from the sequence of invariants to a message symbol from the sequence of message symbols, the binding defining the translation alphabet from a non-injective mapping of the invariant symbols to the message symbols.

3. The method of claim 1 wherein each message symbol of the message has a corresponding invariant defined by a corresponding position in each respective sequence such that the invariant symbol has maps to multiple message symbols, the set of parsed invariants defining a translation alphabet having multiple translations in the message symbols resulting from the same invariant symbol.

4. The method of claim 3 further comprising authenticating the code segment by validating each symbol in the message against the set of symbols associated with the corresponding invariant symbol from the sequence of invariants.

5. The method of claim 3 further comprising mapping each invariant to a symbol in the message, the message configured for subsequent validation of the code segment by mapping each symbol of the message to the corresponding invariant, each occurrence of a particular invariant independent of the mapping applied to other occurrences of the same invariant.

6. The method of claim 1 further comprising authenticating the code segment by:
   retrieving the message;
   parsing each invariant from the code segment;
   identifying the set of symbols to which each parsed invariant corresponds;
   comparing, in an iterative manner, each successive symbol of the message to the set of symbols corresponding to each successively parsed invariant; and
   confirming if each successive symbol is in the set of symbols corresponds to the respective parsed invariant.

7. A computer program product having computer program code encoded as a set of instructions on a non-transitory computer readable storage medium that, when executed by a processor, cause the computer to perform a method for encoding steganographic messages by invariant recognition, the method comprising
   parsing, from a code segment, a sequence of invariants, the invariants corresponding to fixed values in an instruction sequence, each invariant defined by an invariant symbol;
   selecting a message from a sequence of message symbols from an alphabet; and
   defining a translation alphabet by mapping each message symbol in the selected message to a successive invariant in the sequence of invariants, the mapping associating each of the invariant symbols to a subset of the message symbols from which the message is composed, each occurrence of an invariant symbol associated with a plurality of message symbols in the subset of symbols the mapping defining the message in the unmodified sequence of invariants from the code segment that leaves the instruction sequence unchanged.

8. The method of claim 1 wherein each invariant symbol maps to multiple message symbols, the set of parsed invariants defining a translation alphabet having multiple translations in the message symbols resulting from the same invariant symbol.

* * * * *